United States Patent [19]
Demajistre

[11] 3,979,426
[45] Sept. 7, 1976

[54] RADIATION-SENSITIVE DIACRYLATES
[75] Inventor: Robert Demajistre, Natrona Heights, Pa.
[73] Assignee: PPG Industries, Inc., Pittsburgh, Pa.
[22] Filed: Feb. 5, 1973
[21] Appl. No.: 329,914

Related U.S. Application Data
[63] Continuation-in-part of Ser. No. 171,321, Aug. 12, 1971, abandoned.

[52] U.S. Cl............... 260/404.5; 204/159.22; 252/183.3 R; 260/468 E; 260/471 C; 260/482 B; 427/12
[51] Int. Cl.² ........................ C07C 125/06
[58] Field of Search......... 260/471 C, 482 B, 468 E, 260/404.5

[56] References Cited
UNITED STATES PATENTS
3,428,614  2/1969  Brownstein .............. 260/471 C
3,783,151  1/1974  Carlick et al. ............ 260/471 C FOREIGN PATENTS OR APPLICATIONS
815,050  6/1969  Canada Primary Examiner—Richard L. Raymond
Attorney, Agent, or Firm—George D. Morris

[57] ABSTRACT

Novel diacrylates are prepared by reacting a monohydroxylated acrylic monomer with a polyisocyanate. The reaction product may be polymerized by subjecting to ionizing irradiation, actinic light or to free radical catalysts to form a useful coating material. The diacrylates may also be copolymerized with other radiation sensitive materials.

6 Claims, No Drawings

RADIATION-SENSITIVE DIACRYLATES

CROSS-REFERENCE TO RELATED APPLICATION

This application is a continuation-in-part of application Ser. No. 171,321, filed Aug. 12, 1971 now abandoned.

BACKGROUND OF THE INVENTION

This invention in general deals with novel compounds which are highly radiation sensitive. The novel diacrylates, when subjected to ionizing irradiation or to actinic light or to free radical catalysts polymerize to form extremely strong, stain-resistant materials. These cured materials show excellent resistance to the most stringent staining tests and are scratch resistant and mar resistant.

The novel monomers produced in accordance with this invention comprise compounds having the formula:

$$R(\overset{O}{\overset{\|}{C}})_m OCH_2 CHCH_2 O\overset{O}{\overset{\|}{C}}C=CH_2 \quad (I)$$

(with pendant $-O-C(=O)-NH-Y-NH-C(=O)-O-$ linkage to a second identical acrylate group)

wherein R is n-octyl, isooctyl, 2-ethylhexyl, decyl, dodecyl, tetradecyl, eicosyl and the like or a tertiary alkyl group of the formula $$R_2 - \underset{R_3}{\overset{R_1}{\underset{|}{C}}} - \quad (II)$$

wherein $R_1$, $R_2$ and $R_3$ are alkyl groups containing 1 to 5 carbon atoms, such as methyl, ethyl, butyl, pentyl and the like. The total carbon atoms in $R_1$, $R_2$ and $R_3$ may be as great as 15 and preferably is from 7 to 9. When $R_1$, $R_2$ and $R_3$ are each methyl, R is tert-butyl.

Y is a divalent hydrocarbon radical containing from 6 to 16 carbon atoms such as phenylene, methylphenylene, trimethylhexamethylene, methylene bis(p-phenylene), methylene bis(cyclohexylene) and the like.

X is hydrogen or methyl; hydrogen is preferred.

The subscript $m$ is an integer having a value of 0 or 1; a value of 1 is preferred.

These monomers may be utilized as coating materials and may be coated and cured on various substrates in situ.

A preferred subclass results when Y in Formula I is:

(methylphenylene radical) (III)

or (trimethyl cyclohexylene-methylene radical with S) (IV)

The two unsatisfied bonds of the methylphenylene radical of Formula (III) may be located in any positions. The preferred locations are the 2,4-positions, the 2,6-positions and the 2,5-positions.

A further preferred subclass of compounds occurs when, in Formula (I), R is the tertiary alkyl radical of Formula (II) and Y is either the radical of Formula (III) or the radical of Formula (IV). Especially preferred members of this subclass result when the value of $m$ is 1 and X is hydrogen. These latter monomers fall within the formulae:

(V)

and (VI)

The novel monomers described above may be formed by reacting a monohydroxylated acrylic monomer having the formula:

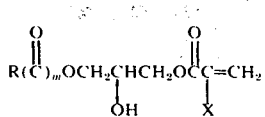

wherein R, X and $m$ are as described above, with a polyisocyanate having the formula:

$$O=C=N-Y-N=C=O$$

wherein Y is as described above. When Y is phenylene, methylphenylene or a similar radical, the two isocyanato groups may be located in any of the vacant positions. For the toluene diisocyanates the 2,4-positions, the 2,6-positions and the 2,5-positions are preferred. Mixtures of isomers may be employed. One commercially available mixture of toluene diisocyanates comprises about 80 percent 2,4-diisocyanatotoluene and about 20 percent 2,6-diisocyanatotoluene.

Basically the monohydroxylated acrylic monomer may be formed by reacting a monofunctional epoxide such as a glycidyl ether or glycidyl ester represented by the formula:

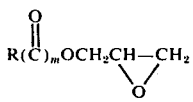

wherein R and $m$ are as heretofore defined, with an ethylenically unsaturated carboxylic acid such as acrylic or methacrylic acid in the presence of a catalyst and preferably an inhibitor. The catalyst may be any organic base material such as tertiary amines exemplified by N-methylmorpholine and triethylamine. Standard inhibitors such as methylquinone may be used. The reaction is preferably carried out at a temperature of from about 50°C. to 140°C. The reaction is carried out until the acid value is equal to or less than about 5. The resulting secondary hydroxy alkyl acrylate or methacrylate is then reacted with a difunctional isocyanate to form the novel monomers which contain two acrylate or methacrylate bonds and two urethane linkages.

The reaction between the acrylic monomer and the polyfunctional isocyanate may be carried out at any temperature but is preferably run at from about 60°C. to about 100°C. Catalysts such as dibutyltin dilaurate, triethylamine, butylstanoic acid, and the like may be used to promote the reaction. The acrylic monomer and polyisocyanate may be reacted in a weight ratio of from about 0.5:1 to about 1.5:1.

The monomer produced by the above-described process may be homopolymerized, copolymerized or interpolymerized in the presence of free radical catalysts, by actinic light, or by irradiation. The novel monomer may be copolymerized or interpolymerized with other monomers such as acrylic monomers. These acrylic monomers are exemplified by the alkyl acrylates and aklyl methacrylates and preferably di- or tri-acrylates and methacrylates. The monomer of the invention may be combined with polymers and used as mixtures. If the polymers are curable, the polymers and the monomer comprising the mixture may be co-cured. If the polymers are not further curable, the monomer may be cured in admixture with the polymer. Polymers which may be mixed with the novel monomers of the invention include poly(alkylacrylates) such as poly(ethylacrylate), poly(2-ethylhexylacrylate) and poly(butylacrylate), unsaturated polyesters such as poly(propylene maleate phthalate) and polyethylene maleate; saturated polyesters such as poly(ethyleneadipate) and poly(propylene phthalate); vinyl polymers such as poly(vinylchloride) and vinylchloride-vinylacetate copolymer; cellulosic polymers such as cellulose acetate butyrate and cellulose acetate.

In all of the uses described above, mixtures of the monomers of the invention may be employed rather than a single such monomer. Also, the compounds of this invention may be mixed with other monomers or polymers and then cured either by using peroxide or by subjecting the mixture to actinic light or to ionizing irradiation. Ordinarily, the mixture contains at least about 5 percent by weight of a compound or a mixture of compounds of the invention. The preferred embodiments of this invention entail the curing of the novel monomers of this invention or of mixtures of the monomers by actinic light or by ionizing irradiation.

As the monomers prepared in this manner are extremely radiation-sensitive, and since radiation-sensitivity is both difficult to achieve and to predict, a feature of this invention is to polymerize the monomers herein by subjecting them to ionizing irradiation.

The term "irradiation", as used herein, means high energy radiation and/or the secondary energies resulting from conversion of electrons or other particle energy to X-rays or gamma radiation. While various types of irradiation are suitable for this purpose, such as X-rays and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation", which has been defined as radiation possessing an energy at least sufficient to produce ions or to break chemical bonds and thus includes also radiations such as "ionizing particle radiation" as well as radiations of the type termed "ionizing electromagnetic radiation".

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, Cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Massachusetts, or other types of accelerators as described in U.S. Pat. No. 2,763,609 and in British Pat. No. 762,953 are satisfactory for the practice of this invention.

The monomers and mixtures of monomers described herein whether alone or in admixture with one or more other radiation sensitive monomers will polymerize acceptably using any total dosage between about 0.2 megarad and about 20 megarads. A "rad" is defined as that amount of radiation required to supply 100 ergs per gram of material being treated, and a "megarad" is $10^6$ rads. The total dosage is the total amount of irradiation received by the monomer. It has been found that the monomers of this invention will polymerize to hard, mar-resistant and stain-resistant films at a total dosage of less than 4 megarads. The preferable dosage used is from about 0.5 megarad to about 10 megarads.

The monomers and mixtures of monomers of this invention may also be polymerized and cured by a free-radical mechanism where free-radical catalysts are added and the monomers are heated to polymerize. Any conventional free-radical catalyst may be used, such as organic peroxides, organic hydroperoxides, or esters thereof. Examples are benzoyl peroxide, tertiary-butyl perbenzoate, tertiary-butyl hydroperoxide, cumene hydroperoxide, azobis(isobutyronitrile) and the like. The catalysts are generally used in amounts of about 0.1 percent to about 5 percent by weight of the monomer or mixture of monomers.

The monomers and catalysts may be heated to cure. Although curing temperatures will vary from monomer to monomer, generally temperatures from about 75°F. to about 300°F. are used to bring about the free-radical cure of the monomers.

In many instances, it may be desirable to polymerize without the addition of external heat in which cases it is customary to add an accelerator to the system. Suitable accelerators include cobalt salts, such as cobalt octoate or cobalt naphthenate and amine accelerators such as N,N-dimethylaniline, N-ethyl-N-hydroxyethyl-m-ethylaniline and N-propyl-N-hydroxyethyl-m-methylaniline.

The novel acrylic monomers may also be co-cured with various other copolymerizable ethylenically unsaturated monomers or with polymeric materials using the above-described free-radical mechanisms.

The polymers or copolymers formed by the polymerization of the new monomers of this invention have great utility as coatings for all types of substrates. They may be used as protective coatings for wood to form panels for walls, as coatings on plastics to form floor tiles, as coatings on metals such as aluminum and steel panels and as coatings for other substrates, and they have the advantage of having superior stain-resistance, scratch-resistance, mar-resistance, weather-resistance and chemical-resistance (to acids and bases) and the cured coatings have a high degree of crosslinking. These coatings are also relatively flexible and capable of forming strong bonds with various substrates.

The coatings may be formed by applying the monomer to a substrate by any conventional coating means, such as roller coatings, curtain coating, brushing, spraying, etc. The coated article may then be cured either by adding peroxide to the coating or by subjecting the coating to actinic light or to ionizing irradiation. It is noted that many of the monomers have extremely low viscosity, thus insuring easy application if the product is to be used as a coating.

The use of ionizing irradiation to polymerize the monomers is preferred as this method makes it possible to polymerize the coatings at extremely high speeds and thus eliminate the time-consuming baking steps, and as the use of ionizing irradiation requires no heating, the danger of high temperatures damaging a heat-sensitive substrate is eliminated.

It is also noted that the use of ionizing irradiation requires no solvents, thus reducing the danger of poisonous and explosive solvent vapors and that the coatings formed by the use of ionizing irradiation are more highly crosslinked and are generally stronger coatings than the conventionally cured coatings.

The following examples set forth specific embodiments of the instant invention, however, the invention is not to be construed as being limited to these embodiments for there are, of course, numerous possible variations and modifications. All parts and percentages in the examples as well as throughout the specification are by weight unless otherwise indicated.

EXAMPLE 1

A monohydroxylated acrylic monomer was prepared by charging a reactor with 264.5 grams of a mixture of the glycidyl ethers of n-octyl and n-decyl alcohols (Epoxide No. 7) and 0.67 gram of methylquinone and the reactants were heated at 25°C. After adding 0.67 gram of triethylamine, the temperature was raised to 85°C. and held for 20 minutes and 72 grams of acrylic acid were added over a ½ hour period. The reactants were held at about 107°C. for 10 hours until the acid number was 3.63. The hydroxyl value was 192 and the epoxy equivalence was 2,945.51.

A reactor was charged with 150 grams of the above prepared monohydroxylated acrylic monomer and heated to 60°C. Dibutyltin dilaurate in the amount of 0.1 gram was then added. The mixture was stirred for about 25 minutes. Over a further period of about 28 minutes 39.4 grams of a mixture of toluene diisocyanates comprising about 80 percent 2,4-diisocyanatotoluene and about 20 percent 2,6-diisocyanatotoluene was added at 92° to 95°C. The reactor was then held for about 2 hours at 95°C. The resulting monomer had an NCO equivalence of 90,000 and a hydroxyl value of 89.4.

EXAMPLE 2

A reactor was charged with 296 grams of a mixture of the glycidyl esters of dodecyl and tetradecyl alcohols (Epoxide No. 8) and 0.75 gram of methylquinone and heated to 35°C. At that time 0.75 gram of triethylamine was added and the reactants were held at about 86°C. for 20 minutes. Over a period of 1½ hours 72 grams of acrylic acid were added at a temperature of about 103°C. and the reactants were held at that temperature for an additional 17 hours until the acid number was 4.5. The resulting monohydroxy acrylic monomer had an OH value of 159, an epoxy equivalency of 11,042 and an acid value of 5.39.

To 150 grams of the above monomer was added 0.1 gram of dibutyltin dilaurate and the mixture was heated to 90°C. To the mixture were added over a 15 minute period 39.4 grams of a mixture of toluene diisocyanates comprising about 80 percent 2,4-diisocyanatotoluene and about 20 percent 2,6-diisocyanatotoluene and the reaction was continued for an additional period of about 2 hours at 95°C. The resulting monomers had a hydroxyl value of 77.68.

EXAMPLE 3

A reactor was charged with 296 grams of (Epoxide No. 8) and 0.75 gram of methylquinone and heated to 35°C. At that time 0.75 gram of triethylamine was added and held at about 86°C. for 20 minutes. Over a period of 1½ hours 72 grams of acrylic acid were added at a temperature of about 103°C. and the reactants were held at that temperature for an additional 17 hours until the acid number was 4.5. The resulting monohydroxy acrylic monomer had an OH value of 159, an epoxy equivalency of 11,042 and an acid value of 5.39.

A reactor was charged with 150 grams of the above monomer and 0.1 gram of dibutyltin dilaurate and heated to 86°C. To the mixture, over a 30 minute period, were added 51.7 grams of 1-isocyanatomethyl-5-isocyanato-1,3,3-trimethylcyclohexane at about 95°C. and the reactants were held at that temperature for an additional period of about 2½ hours. The resulting monomer had a hydroxyl value of 36.1.

EXAMPLE 4

A reactor was charged with 36 grams of acrylic acid and heated to 100°C. Over a one hour period, 122.5 grams of the glycidyl ester of a tertiary monocarboxylic acid (Versatic 911 acid) having from 9 to 11 carbon atoms in the carboxylic acid moiety (Cardura "E" ester) were added and the reactants were kept at that temperature until the acid value was less than 5. The mixture was then cooled to 95°C. and one drop of dibutyltin dilaurate was added and 43.5 grams of a mixture of toluene diisocyanates comprising about 80 percent 2,4-diisocyanatotoluene and about 20 percent 2,6-diisocyanatotoluene were added dropwise and the reactants were heated for an additional period of about ½ hour. The resulting product had an acid value of 78 and may be represented as a mixture of compounds of the formulae:

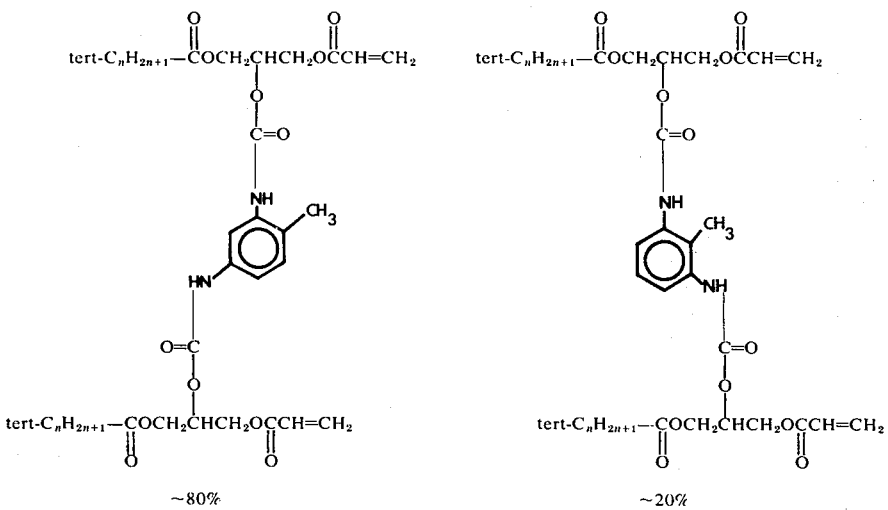

where the value of $n$ is 8, 9 or 10. For each individual compound the value of $n$ in one tertiary alkyl group may be the same as or different from the value of $n$ in the other.

EXAMPLE 5

A reactor was charged with 36 grams of acrylic acid and heated to 100°C. Over a one hour period, 122.5 grams of (Cardura "E" ester) were added and the reactants were kept at that temperature until the acid value was less than 5.

To 317 grams of the above monomer were added dropwise a mixture of 111 grams of 1-isocyanomethyl-5-isocyano-1,3,3-trimethylcyclohexane and one drop of dibutyltin acetate over a one hour period and the reactants were kept at 95°–100°C. for an additional period of about 2 hours. The product had an NCO equivalence of 20,000 and a Gardner-Holdt viscosity of Z7–8 and may be represented as a mixture of compounds of the formula:

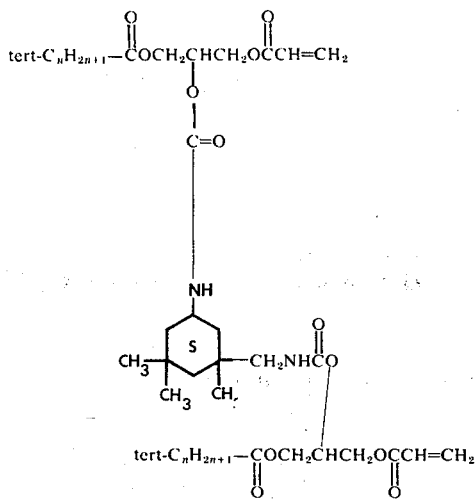

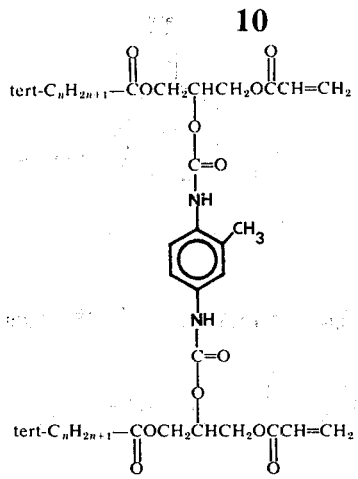

where the value of $n$ is 8, 9 or 10. For each individual compound the value of $n$ in one tertiary alkyl group may be the same as or different from the value of $n$ in the other.

EXAMPLE 6

A reactor was charged with 393.8 grams of glycidyl stearate and 0.22 gram of methylquinone and heated to 80°C. Over a ½ hour period 0.22 gram of triethylamine was added at 100°C. and 72 grams of acrylic acid were then added over an 18 minute period and the reactants were kept at 105°C. for an additional 3 hours until the acid number was 4.85. At that point 0.07 gram of dibutyltin dilaurate was added at 95°C. and 45.8 grams of a mixture of toluene diisocyanates comprising about 80 percent 2,4-diisocyanatotoluene and about 20 percent 2,6-diisocyanatotoluene were added over a 3 hour and 40 minute period at 95°C. The resulting product had an NCO equivalency of 2,910 and a hydroxyl value of 13.30.

EXAMPLE 7

To 90 parts of the composition of Example 5 were added 10 parts of butyl acrylate and the mixture was coated onto an aluminum panel and subjected to electron beam bombardment to a total of 2.6 megarads in a nitrogen atmosphere. The coating was stained with ink, mustard, and merthiolate and was found to be resistant to all stains.

EXAMPLE 8

A reactor is charged with 36 grams of acrylic acid and heated to 100°C. Over a one hour period, 122.5 grams of the glycidyl ester of a tertiary carboxylic acid (Versatic acid) having from 9–11 carbon atoms in the carboxylic acid moiety (Cardura "E" ester) are added and the reactants kept at that temperature until the acid value was less than 5. The reactants are then cooled to 95°C. and one drop of dibutyltin dilaurate is added and 43.5 grams of toluene diisocyanate are added dropwise and the reactants heated to 95°C. for an additional period of about ½ hour. The resulting product is a mixture of compounds of the formula:

where the value of $n$ is 8, 9 or 10. For each individual compound the value of $n$ in one tertiary alkyl group may be the same or different from the value of $n$ in the other.

According to the provisions of the patent statutes, there is described above the invention and what are now considered to be its best embodiments. However, within the scope of the appended claims, it is to be understood that the invention can be practiced otherwise than is specifically described.

I claim:
1. A compound represented by the general formula:

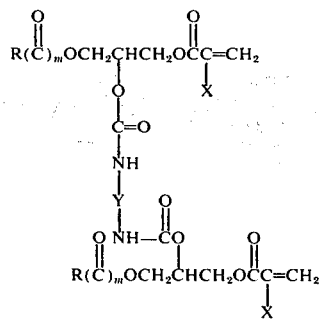

wherein
a. R is selected from the group consisting of n-octyl, isooctyl, 2-ethylhexyl, decyl, dodecyl, tetradecyl, eicosyl and tertiary alkyl of the formula

wherein $R_1$, $R_2$ and $R_3$ are alkyl groups containing 1 to 5 carbon atoms;
b. Y is a divalent hydrocarbon radical containing from 6 to 16 carbon atoms;
c. X is hydrogen or methyl; and
d. $m$ is 0 to 1.
2. The compound of claim 1 wherein Y is

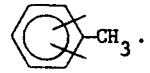

3. The compound of claim 1 wherein X is hydrogen.
4. The compound of claim 1 wherein Y is 11
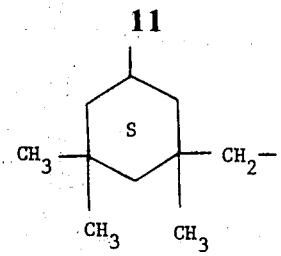
5. A compound represented by the general formula
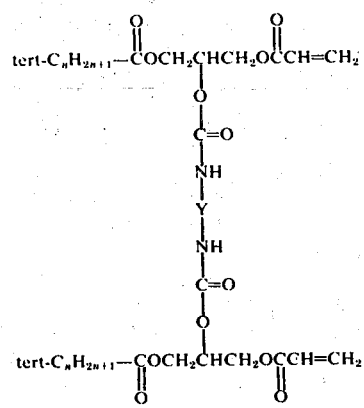
wherein
 a. Y is selected from the group consisting of
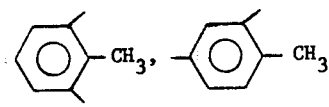
and
12
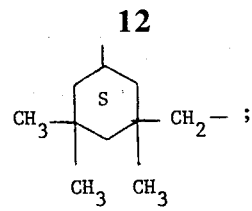
and
 b. n is 8, 9 or 10.
6. A compound represented by the formula
RCOCH₂CHCH₂OCCH=CH₂
        ‖       |    ‖
        O       O    O
                |
                C=O
                |
                NH
                |
                Y
                |
                NH—CO
                      |
                      O
                      |
RCOCH₂CHCH₂OCCH=CH₂
     ‖       |    ‖
     O       O    O
wherein
 a. R is heptadecyl; and
 b. Y is
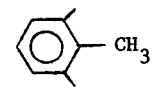
or
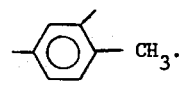
* * * * *

UNITED STATES PATENT OFFICE
CERTIFICATE OF CORRECTION

PATENT NO. : 3,979,426
DATED : September 7, 1976
INVENTOR(S) : Robert DeMajistre It is certified that error appears in the above-identified patent and that said Letters Patent are hereby corrected as shown below:

Cover sheet, name of inventor, two occurrences, "m" should be --M--.

Columns 7 and 8, lines 20 to 45, first formula, that portion of the formula reading $$\begin{array}{c}\text{"HN"}\\|\\O=C\end{array}$$

should read $$\begin{array}{c}--HN--\\|\\O=C\end{array} ;$$

second formula, that portion of the formula reading $$\begin{array}{c}\text{"NH"}\\|\\C=O\end{array}$$

should read $$\begin{array}{c}--NH--\\|\\C=O\end{array}$$

Column 10, line 63, "to" should be --or--.

Column 12, lines 20 to 25, that portion of the formula reading $$\begin{array}{c}\text{"NH"}\\|\\O\\|\\RCOCH_2\end{array}$$

should read $$\begin{array}{c}--NH--\\|\\O\\\|\|\\RCOCH_2\end{array}$$

Signed and Sealed this

Thirtieth Day of November 1976

[SEAL]

Attest:

RUTH C. MASON
*Attesting Officer*

C. MARSHALL DANN
*Commissioner of Patents and Trademarks*